United States Patent
Brand et al.

(10) Patent No.: US 12,448,111 B1
(45) Date of Patent: Oct. 21, 2025

(54) METHOD AND SYSTEM FOR INVERSE-TAPERED HIGH-SPEED ROTORS

(71) Applicant: Textron Innovations Inc., Providence, RI (US)

(72) Inventors: Albert G. Brand, North Richland Hills, TX (US); Andrew Thomas Carter, Richland Hills, TX (US); Matthew J. Hill, Keller, TX (US); Brian Erik Barnes, Bedford, TX (US); Paul Sherrill, Grapevine, TX (US); Bryan Huber, Keller, TX (US); Madeline Kvaka, Grand Prairie, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/638,168

(22) Filed: Apr. 17, 2024

(51) Int. Cl.
| | |
|---|---|
| *B64C 27/46* | (2006.01) |
| *B64C 11/18* | (2006.01) |
| *B64C 11/20* | (2006.01) |
| *G06F 30/17* | (2020.01) |
| *G06F 30/28* | (2020.01) |
| *B64C 27/467* | (2006.01) |

(Continued)

(52) U.S. Cl.
CPC .............. *B64C 11/18* (2013.01); *B64C 11/205* (2013.01); *G06F 30/17* (2020.01); *G06F 30/28* (2020.01); *B64C 27/463* (2013.01); *B64C 27/467* (2013.01); *B64C 27/473* (2013.01); *G06F 2111/10* (2020.01)

(58) Field of Classification Search
CPC .............................. B64C 27/467; G06F 30/28
See application file for complete search history.

(56) References Cited

U.S. PATENT DOCUMENTS

| | | | | |
|---|---|---|---|---|
| 1,692,081 A | * | 11/1928 | La Cierva | B64C 27/023 416/223 R |
| 2,070,657 A | * | 2/1937 | Hafner | B64C 27/025 416/118 |

(Continued)

FOREIGN PATENT DOCUMENTS

DE        2621982 A1    12/1976

OTHER PUBLICATIONS

Perry, F J, "Aerodynamics of the Helicopter World Speed Record," 43rd Annual National Forum of the American Helicopter Society, May 1987, pp. 3-15.

(Continued)

*Primary Examiner* — Courtney D Heinle
*Assistant Examiner* — Behnoush Haghighian
(74) *Attorney, Agent, or Firm* — Bradley Arant Boult Cummings LLP

(57) ABSTRACT

A method of designing a rotor blade for a rotary aircraft includes establishing a target thrust-weighted solidity of the rotor blade, calculating a reverse flow circle of the rotor blade at a target forward speed of the rotary aircraft, inboard of the reverse flow circle, decreasing chord of the rotor blade relative to a baseline rotor blade possessing the target thrust-weighted solidity, and outboard of the reverse flow circle, increasing the chord of the rotor blade relative to the baseline rotor blade. The rotor blade possesses the target thrust-weighted solidity of the baseline rotor blade and improved stall margin or speed margin at the target forward speed relative to the baseline rotor blade.

22 Claims, 5 Drawing Sheets

(51) Int. Cl.
*B64C 27/473* (2006.01)
*G06F 111/10* (2020.01)

(56) References Cited

U.S. PATENT DOCUMENTS

| | | | | |
|---|---|---|---|---|
| 2,152,861 A * | 4/1939 | Bennett | ............... | B64C 27/023 244/123.7 |
| 3,053,325 A * | 9/1962 | Ferreira | ............... | B64C 11/16 416/228 |
| 3,066,742 A * | 12/1962 | Castles, Jr. | ............... | B64C 27/463 987/234 |
| 3,200,477 A * | 8/1965 | Shultz | ............... | B64C 27/473 416/213 A |
| 3,399,731 A * | 9/1968 | Giles, Jr. | ............... | B64C 27/463 416/237 |
| 3,467,197 A * | 9/1969 | Drees | ............... | B64C 27/463 416/228 |
| 3,822,105 A * | 7/1974 | Jepson | ............... | B64C 27/467 416/223 R |
| 4,077,741 A * | 3/1978 | Lowson | ............... | B64C 27/463 416/228 |
| 4,324,530 A * | 4/1982 | Fradenburgh | ............... | B64C 27/463 416/228 |
| 4,339,230 A * | 7/1982 | Hill | ............... | F03D 1/0675 416/226 |
| 4,975,022 A * | 12/1990 | Perry | ............... | B64C 27/463 244/17.11 |
| 5,246,344 A * | 9/1993 | Perry | ............... | B64C 27/463 416/228 |
| 5,927,948 A * | 7/1999 | Perry | ............... | B64C 27/463 244/17.11 |
| 5,992,793 A * | 11/1999 | Perry | ............... | B64C 27/463 244/17.11 |
| 7,252,479 B2 * | 8/2007 | Bagai | ............... | B64C 27/467 416/223 R |
| 7,600,976 B2 * | 10/2009 | Bagai | ............... | B64C 27/10 416/223 R |
| 8,286,908 B2 * | 10/2012 | Kebrle | ............... | F04D 29/661 244/17.19 |
| 8,640,984 B2 * | 2/2014 | Kebrle | ............... | F01D 5/10 244/17.19 |
| 10,906,638 B2 * | 2/2021 | Kopanski | ............... | B64C 27/467 |
| 11,192,644 B2 * | 12/2021 | Desvigne | ............... | B64C 27/48 |
| 11,214,364 B2 * | 1/2022 | Sugiura | ............... | B64C 27/473 |
| 2006/0269418 A1 * | 11/2006 | Bagai | ............... | B64C 27/467 416/223 R |
| 2007/0110582 A1 * | 5/2007 | Bagai | ............... | B64C 27/10 416/223 R |
| 2009/0014581 A1 * | 1/2009 | Kebrle | ............... | F04D 29/661 244/1 N |
| 2013/0032664 A1 * | 2/2013 | Kebrle | ............... | F04D 29/661 416/223 R |
| 2014/0147620 A1 * | 5/2014 | Li | ............... | D06M 15/51 428/221 |
| 2017/0001710 A1 | 1/2017 | Klein et al. | | |

OTHER PUBLICATIONS

Hopkins, Harry, "Fastest blades in the world," Flight International, Dec. 27, 1986, pp. 24-27.

Fitzgibbon, Thomas et al., "Assessment of current rotor design comparison practices based on high-fidelity CFD methods," The Aeronautical Journal, vol. 124, Issue 1275, Glasgow, United Kingdom, Dec. 9, 2019, pp. 731-766.

Wikipedia, "Helicopter rotor," https://en.wikipedia.org/wiki/Helicopter_rotor, Wikimedia Foundation, last accessed Nov. 16, 2023, 14 pages.

Library of Congress, "Table of contents for Principles of helicopter aerodynamics/ / J. Gordon Leishman," https://catdir.loc.gov/catdir/toc/ecip0518/2005025467.html, last accessed Nov. 30, 2023, 8 pages.

* cited by examiner

METHOD AND SYSTEM FOR INVERSE-TAPERED HIGH-SPEED ROTORS

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to rotary-aircraft rotor-blade design and manufacturing, and more particularly, but not by way of limitation, to inverse-tapered high-speed rotors and blades incorporated therein.

BACKGROUND

This section provides background information to facilitate a better understanding of the various aspects of the disclosure and the statements in this section are to be read in this light, and not as admissions of prior art.

For a single main rotor ("SMR") design used in a rotary aircraft, a limiting factor on flight speed is the size of the reverse flow circle and the corresponding low dynamic pressure ("q") on the retreating blade of the single main rotor. The reverse flow circle is a circle with a diameter equal to the advance ratio ("µ"). Advance ratio represents the forward flight speed as a fraction of the rotor blade's tip speed in hover. For a helicopter, forward flight speed results in the blades experiencing additional airspeed on the advancing side of the helicopter and reduced airspeed on the retreating ide of the helicopter. When a rotorcraft is flying forward at 0.5 of the rotor-blade tip speed, the advance ratio is 0.5. At that flight speed, the advancing blade, at an azimuth angle of Ψ=90° (measured from tail boom 110 of the helicopter, in the direction of rotation), sees higher airspeed, while the retreating rotor blade, at an azimuth angle of Ψ=270°, sees reduced airspeed, with the inboard half of the rotor-blade span being in reverse flow.

In operation, the single main rotor attempts to balance the asymmetry of high speed on the advancing side and low speed on the retreating side by reducing the advancing rotor blade's pitch while increasing the retreating rotor blade's pitch. At some forward speed, high angles of attack on the retreating rotor blade result in stall, which can introduce controllability issues that serve to limit the forward speed of the rotary wing aircraft.

Conventional methods to achieve greater forward speed include, for example, high-lift airfoils, increased blade chord (including local blade chord increase near the blade tip), and unloading of the SMR by a wing. However, the SMR must still develop significant lift and all of the propulsive force to meet design objectives.

The British Experimental Rotor Program ("BERP") developed local blade chord increase resulting in a paddle-tip rotor-blade design as part of the AgustaWestland EH-101 helicopter. The goal was to increase the helicopter's lift capability and maximum speed. The BERP design was also used on the Westland Lynx helicopter in 1986 and holds the SMR world rotorcraft speed record of 216 kt.

SUMMARY

This summary is provided to introduce a selection of concepts that are further described below in the detailed description. This summary is not intended to identify key or essential features of the claimed subject matter, nor is it intended to be used as an aid in limiting the scope of claimed subject matter.

A method of designing a rotor blade for a rotary aircraft includes establishing a target thrust-weighted solidity of the rotor blade, calculating a reverse flow circle of the rotor blade at a target forward speed of the rotary aircraft, inboard of the reverse flow circle, decreasing chord of the rotor blade relative to a baseline rotor blade possessing the target thrust-weighted solidity, and outboard of the reverse flow circle, increasing the chord of the rotor blade relative to the baseline rotor blade. The rotor blade possesses the target thrust-weighted solidity of the baseline rotor blade and improved stall margin or speed margin at the target forward speed relative to the baseline rotor blade.

A rotor blade for a rotary aircraft includes first chord inboard of a reverse flow circle of the rotor blade and second chord outboard of the reverse flow circle. The first chord is less than the second chord. The rotor blade possesses a target thrust-weighted solidity of a baseline rotor blade. The rotor blade possesses improved stall margin at a target forward speed relative to the baseline rotor blade. Chord of the baseline rotor blade inboard of the reverse flow circle is greater than the first chord and chord of the baseline rotor blade outboard of the reverse flow circle is less than the second chord.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
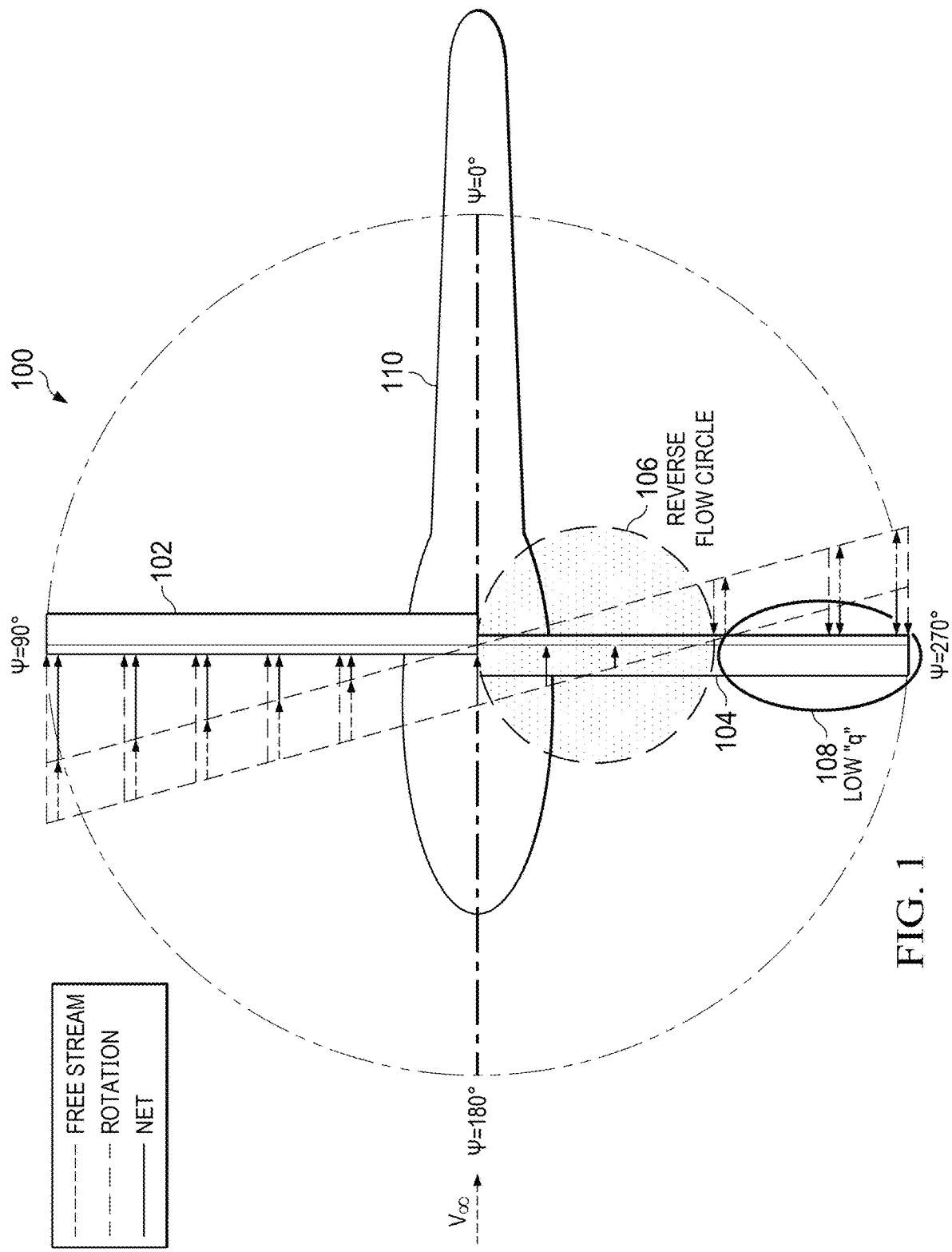
FIG. 1 is a schematic top view of a single main rotor.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 is a schematic top view of a single main rotor 100. The single main rotor 100 includes an advancing rotor blade 102 and a retreating rotor blade 104. The rotor blades 102 and 104, each of which is substantially rectangular in shape, are shown as rotating in an anti-clockwise direction. The approaching wind, relative to the helicopter rotor, is labeled $V_\infty$ in FIG. 1. Blade positions around the rotorcraft are labeled in an anti-clockwise direction as $\Psi=0°$, 90°, 180°, and 270°, where $\Psi=0°$ represents the rear (tailboom) of the rotorcraft. For the advancing rotor blade 102, $\Psi=90°$, the free stream adds to rotational velocity. In contrast, for the retreating rotor blade 104, $\Psi=270°$, the free stream subtracts from rotational velocity. For purposes of this discussion, blade azimuth angles between $\Psi=0°$ and $\Psi=180°$ represent the advancing side of the single main rotor 100, where the approaching wind adds to the rotational speed. In contrast, blade azimuth angles between $\Psi=180°$ and $\Psi=360°$ (or $\Psi=0°$) represent the retreating side of the single main rotor 100, where the wind speed subtracts from the rotational speed.

A rotor blade passing through the reverse flow circle 106, shown at $\Psi=270°$, encounters backwards flow, which is air flow from the blade's trailing edge to the blade's leading edge. This region develops down force rather than lift force. Just outboard of the reverse flow circle, a low dynamic pressure ("q") region 104 to 108 exists on the retreating rotor blade. Reversed flow and low q for blades at $\Psi=270°$ cause the single main rotor 100 to operate with cyclic pitch. Cyclic pitch is used to equalize the lift asymmetry due to the asymmetric blade conditions. On the advancing side, blade pitch is reduced, while on the retreating side, blade pitch is increased in a recurring cyclic (once per revolution) pattern. The high pitch on the retreating blade tends to drive the retreating tip toward stall, while the advancing tip is often driven to negative lift. Ultimately, the ability to match the lift moment between the advancing and retreating sides of the rotor (100) is limited once the retreating blade encounters stall limits at some high angle of attack. Thus, retreating blade stall limits the forward speed that the single main rotor 100 can achieve.

To allow higher forward speed while preserving the thrust-weighted solidity of the single main rotor 100, a method is defined for designing the rotor blades 102 and 104 as disclosed herein. For a rectangular blade planform, the rotor solidity is the ratio of the area of the rotor blades to the area of the rotor disk. If the blade planform is not rectangular, helicopter engineers define the blade's thrust-weighted chord, which is the chord of an equivalent rectangular blade that generates the same hover thrust. Using the thrust-weighted chord yields the thrust-weighted solidity of arbitrary blade planforms in a modern rotor. In general, blade chord near the outboard blade radius produces more thrust than the inboard stations; therefore, in general, chord dimensions in outboard sections of the rotor blades influence thrust-weighted solidity more than inboard sections.

In general, good commercial design practice should aim for minimal rotor solidity to avoid design weight penalties that can cascade throughout an entire aircraft. For a given helicopter weight, the power required to hover is set by the main rotor's diameter and, to the first order, has little to do with the number of blades or chord. Moreover, hover/vertical takeoff is generally the highest power condition of a rotary aircraft's flight envelope. As such, a large rotor diameter is needed to reduce power, but a large blade chord is not. Too much chord would actually increase hover power due to greater profile drag of a larger chord.

Consequently, blade chord is not sized by the hover condition, but is determined on the basis of the desired speed and load factor in forward flight. As a result, a helicopter rotor will have more chord than it needs for hover. More thrust-weighted rotor solidity results in more retreating blade stall margin in high-speed flight; but that increased solidity drives increased weight throughout the design because the rotary wing aircraft will be exposed to load factor capability above and beyond its design weight. Another approach to blade planform design would be desirable, namely, one that does not result in ever-higher thrust-weighted solidity to gain higher forward speeds.

FIG. 1 illustrates why more chord is needed in forward flight than hover. The velocity diagram for $\mu=0.5$ shows that when the rotor blade 104 is on the retreating side ($\Psi=270°$ measured from the tail boom in the rotor's rotational direction), the inboard half of the rotor blade 104 is in reverse flow, such that it is experiencing download and not lift. The next region of the rotor blade, the low dynamic pressure region from 104 to 108, has very low "q", which means reduced lift for the same blade angle of attack. The outboard tip region of the rotor blade 104 must develop a balancing lift that competes with the favorable advancing side where the rotor blade 102 is shown. A rotor swashplate attempts to achieve lift moment balance by reducing pitch on the advancing side and increasing pitch on the retreating side. At this point, if there is insufficient chord in the tip region of the rotor blade 104, the retreating rotor blade 104 will encounter stall that spreads over a larger azimuth range as speed or load factor increase. At some point, retreating blade stall will result in rotor oscillatory loads or controllability issues that can serve to limit the rotary aircraft's forward speed.

Figure 2:
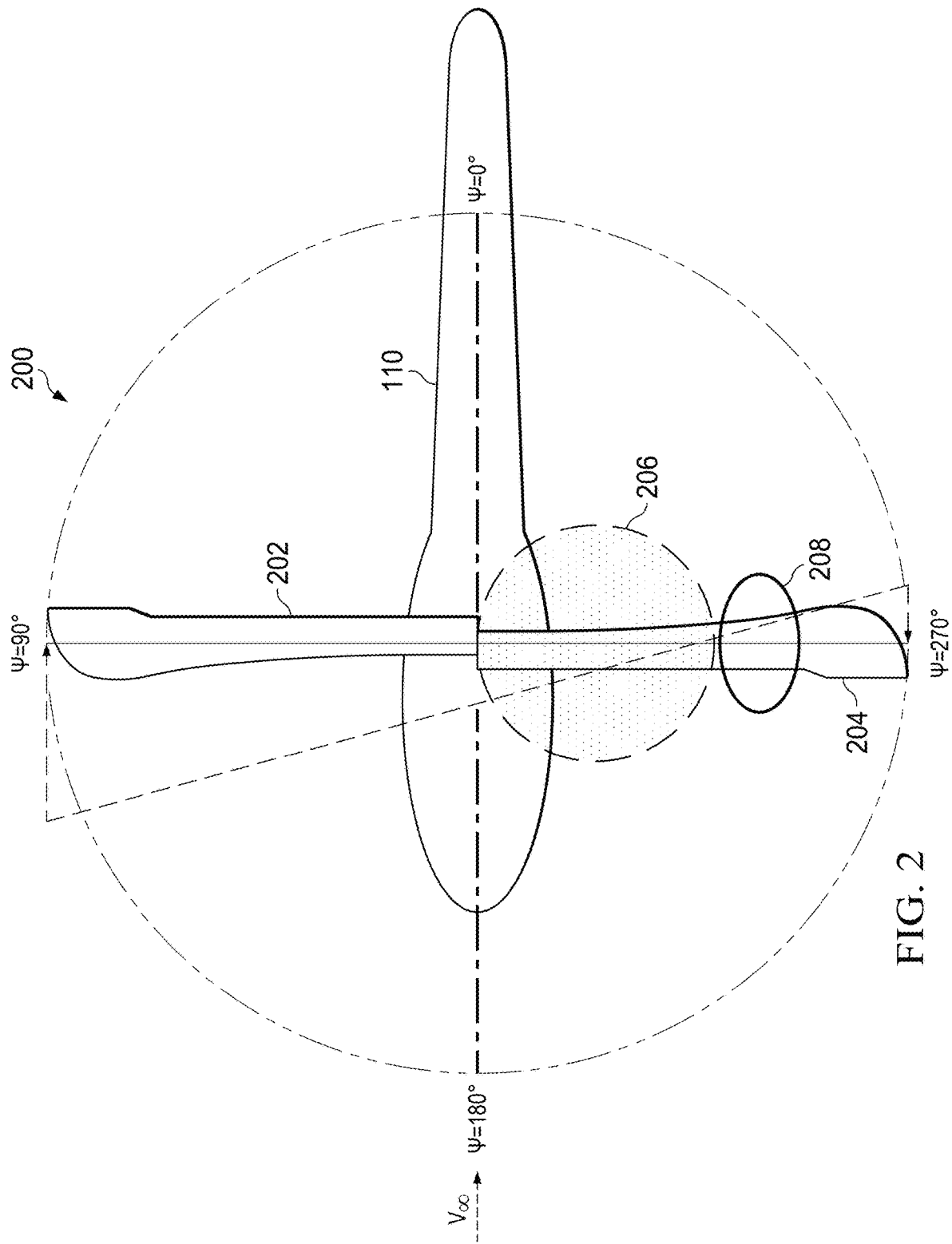
FIG. 2 is a schematic top view of a single main rotor.

FIG. 2 is a top view of a notional main rotor blade 200, shown at two positions ($\Psi=90°$ 202 and $\Psi=270°$ 204) rotating in an anti-clockwise direction. Rotor blade 202 is the advancing and rotor blade 204 is the retreating blade. In FIG. 2, the approaching free stream speed relative to the helicopter is shown as $V_\infty$. In similar fashion to FIG. 1, for the advancing rotor blade position 202, the free stream adds to rotational velocity. In similar fashion, for the retreating rotor blade position 204, free stream subtracts from rotational velocity. In contrast to FIG. 1, the main rotor blade 200 is not rectangular in shape.

Referring to FIG. 2, chord of each of the rotor blades 202 and 204 has been redistributed relative to the substantially rectangular shape of the rotor blades 102 and 104. Blade stations of the rotor blades 202 and 204 passing through reverse flow circle 206 have reduced chord relative to the rotor blades 102 and 104. In addition, blade stations of the rotor blades 202 and 204 passing outboard of the reverse flow circle have increased chord relative to the rotor blades 102 and 104. By tailoring chord reductions inboard of a specific radius (i.e., "transition radius") with outboard chord increases, according to a specific methodology, the single main rotor 200 preserves the thrust-weighted solidity of the rectangular single main rotor 200.

Referring again to FIG. 2, in preserving the thrust-weighted chord, the maximum load factor achievable by the rotor at some airspeed with the modified planform is also preserved and no additional structural design margin would be added to the helicopter. Thus, the empty weight of the helicopter is not increased by modifying the blade planform according to our specific methodology. Since the maximum thrust of the single main rotor 200 is the same as the single main rotor 100, aircraft design loads need not be changed to accommodate the modified rotor. However, an advantage of the single main rotor 200 relative to the rectangular planform single main rotor 100 is that additional chord is placed where it is needed to contend with low "q" on the retreating side of the rotor. In this situation, the additional chord provides margin from retreating blade stall, allowing greater flight speeds to be achieved. In addition, the chord reductions inside the reverse flow circle result in less down force, also improving the rotor's thrust margin at high speeds.

According to our specific methodology, the selection of the transition radius will result in a chord increase outboard of the transition radius that is a multiple of the chord reduction inboard of the transition radius. Reduction of blade chord inboard of the transition radius serves to reduce unfavorable blade downforce in the reverse flow circle 206. The increase in chord outboard of the transition radius benefits the rotor blades 202 and 204 by allowing a reduced angle of attack for the same lift (i.e., stall margin) where q is low. In other words, stall margin (or higher flight speed) can be traded relative to a baseline rotor blade with the same thrust-weighted chord. A modified rotor blade planform such as that shown in FIG. 2 preserves the rotor solidity so that maximum thrust is not increased. As a result, design flight loads and aircraft structural weight do not need to be increased, retreating blade stall margin is improved, higher airspeed for less power is achieved, thrust capability at high-speed allowing more maneuverability and higher rotor propulsive force is increased, thrust capability at high speed thereby, allowing more maneuverability, is improved, and a lower-cost approach to achieve greater airspeed with less complexity is provided.

If it is assumed that it is undesirable to increase the rotor's thrust-weighted chord to delay tip stall, chord needs to be redistributed toward the tip away from the root of the rotor blade in a way that preserves thrust-weighted chord. Thrust-weighted chord is defined by a relationship derived from a statement about any rotor blade planform, and asks the following question: What constant chord (i.e., rectangular) rotor blade of the same radius would produce the same hover thrust as a given arbitrarily tapered blade? In other words, the blade lift L is held constant::

$$L_{tapered}=L_{rectangular\ equivalent} \tag{1}$$

Lift of the arbitrary chord planform where chord c is a function of radius r is equated to the lift of an equivalent lift rectangular blade of chord $c_{equiv}$. The integration of lift along the blade span for each case is given in terms of blade rotational speed $\Omega$, lift coefficient $C_L$ and air density $\rho$:

$$C_L \cdot \frac{1}{2}\rho\Omega^2 \int_0^R r^2 \cdot c(r) \cdot dr = C_L \frac{1}{2}\rho\Omega^2 c_{equiv} \int_0^R r^2 \cdot dr \tag{2}$$

or, $$c_{equiv} U = \frac{3}{R^3} \int_0^R c(r) \cdot r^2 dr \tag{3}$$

At this point, the specific chord redistribution methodology may be introduced, with an objective being to redistribute rotor blade chord along the rotor-blade span while preserving $c_{equiv}$. The specific chord redistribution methodology uses the above-described hover thrust condition and allows a simplified chord redistribution that retains the thrust-weighted chord of the baseline blade. The lift for each blade is thus equated:

$$L_{baseline}=L_{modified}$$

Equation (3) may be rewritten as follows:

$$c_{equiv}\frac{R^3}{3} = \int_0^R c(r) \cdot r^2 dr \tag{4}$$

While holding this relationship, a uniform chord change is applied separately to two segments of the baseline rotor blade to arrive at the modified rotor blade. From the rotor blade root to an arbitrary radial station r/R=τ, chord is subtracted ("Δc1"). Outboard of the arbitrary radial station, from r/R=τ to the rotor blade tip, R, chord is added ("Δc2"). Equation (4) becomes:

$$c_{equiv}\frac{R^3}{3} = \int_0^{\tau R} (c(r) - \Delta c1) \cdot r^2 dr + \int_{\tau R}^R (c(r) + \Delta c2) \cdot r^2 dr \tag{5}$$

Factoring the integrals and combining:

$$c_{equiv}\frac{R^3}{3} = \int_0^R c(r) \cdot r^2 dr - \Delta c1 \int_0^{\tau R} r^2 dr + \Delta c2 \int_{\tau R}^R r^2 dr \tag{6}$$

The first integral is recognized from equation (4), resulting in the cancellation shown above. Equation (7) below results:

$$\Delta c1 \int_0^{\tau R} r^2 dr = \Delta c2 \int_{\tau R}^R r^2 dr \tag{7}$$

Carrying out the integration yields:

$$\Delta c1 * \frac{\tau^* R^3}{3} = \Delta c2 \left( \frac{R^3}{3} - \frac{\tau^3 R^3}{3} \right) \text{ or,} \tag{8}$$

$$\Delta c2 = \Delta c1 \left[ \frac{\tau^3}{1-\tau^3} \right] \tag{9}$$

Thus, if a fixed amount of chord ("Δc1") is removed from the inboard baseline rotor blade (r/R=0 to r/R=τ), a fixed amount of chord ("Δc2") can be added uniformly to the baseline rotor blade from r/R=τ to the rotor blade tip, R. Equation (9) shows that any significant chord increase near the rotor blade tip requires a significant portion of the inboard span of the rotor blade to have chord removed therefrom. If, for example, a particular point is selected where t is set to r/R=0.873, for this position $$\frac{\Delta c2}{\Delta c1} = 2,$$

and the inboard 87.3% of the blade must remove an increment of chord so that the outboard 12.7% of the blade may increase in chord by twice the amount which was removed inboard of r/R=0.873.

Figure 3A:
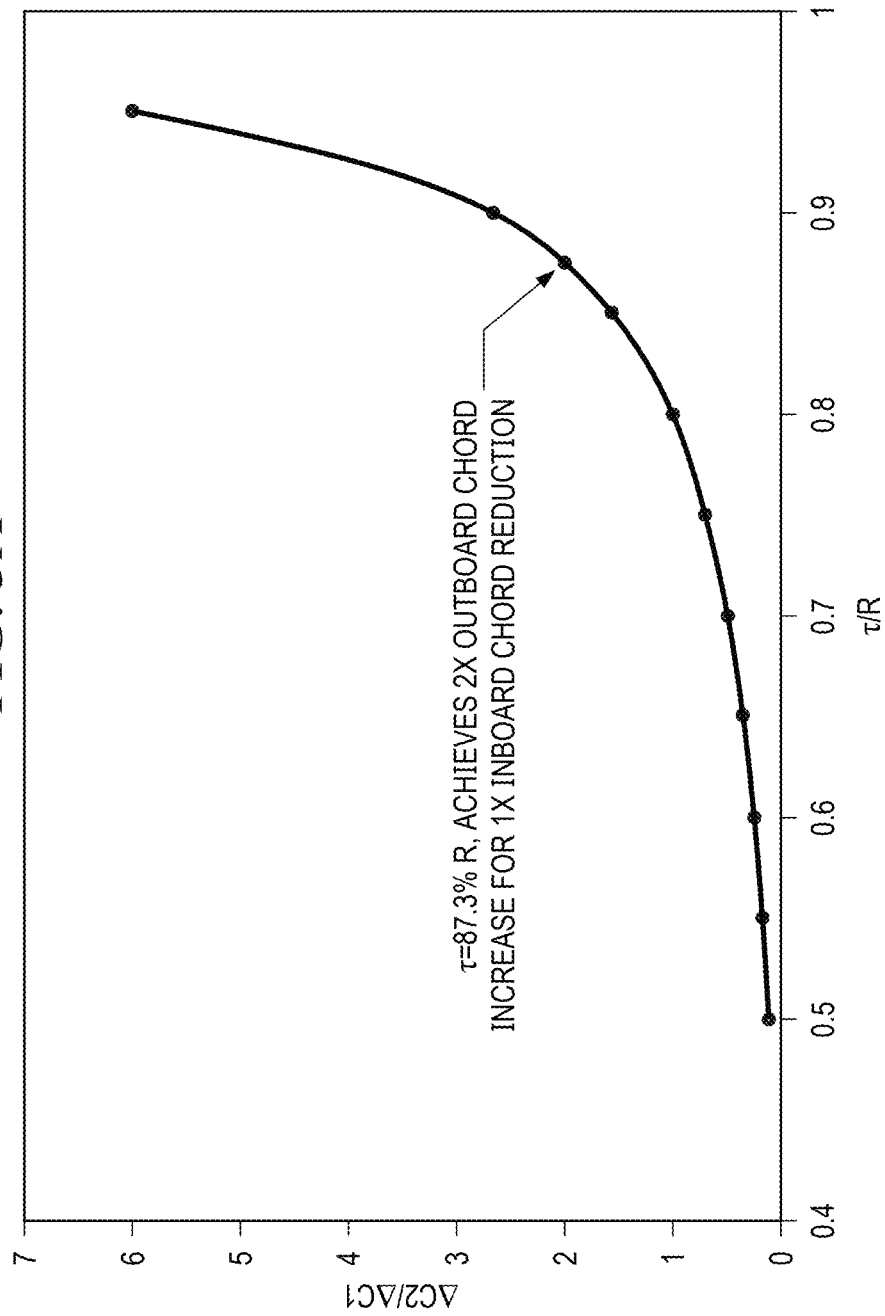
FIG. 3A illustrates a ratio between rotor-blade chord reduction inboard of a transition radius and rotor-blade increase outboard of the transition radius.
Figure 3B:
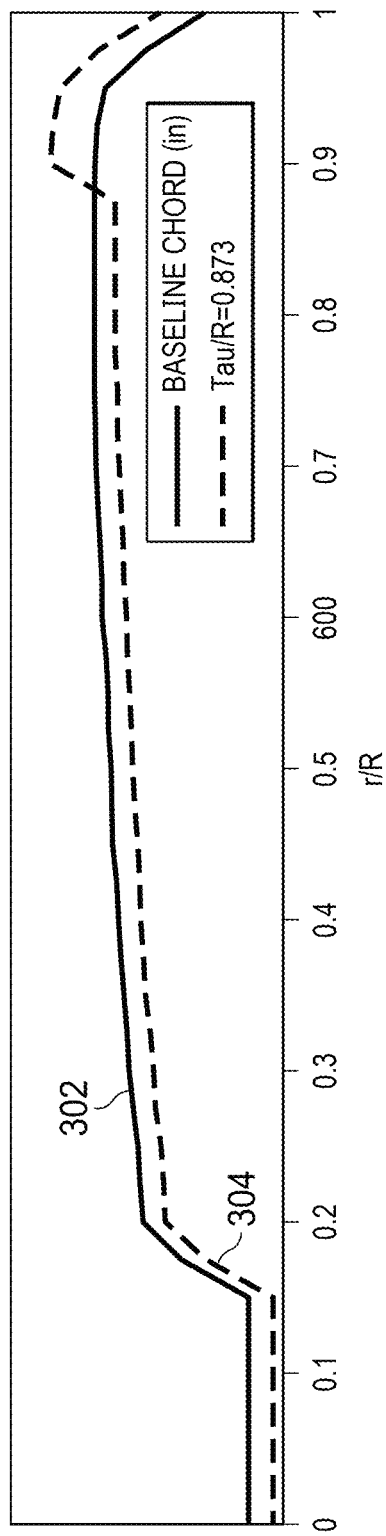
FIG. 3B is a graph that illustrates changes in rotor-blade chord due to application of inverse taper methodology.

FIG. 3B is a graph that illustrates the changes in rotor-blade chord corresponding to $\tau=0.873$, relative to a baseline blade. To maintain constant thrust-weighted solidity, the modified blade reduces the chord by $\Delta c1$ inboard of the transition radius, $\tau=r/R=0.873$, while adding amount of chord ("$\Delta c2$") outboard of the transition radius $\tau=r/R=0.873$. Since $$\frac{\Delta c2}{\Delta c1} = 2$$

for this transition radius, twice as much chord is uniformly added outboard of r/R=0.873 as is uniformly removed inboard of r/R=0.873.

The ratio between $\Delta c1$ and $\Delta c2$ is defined by Equation (9) and modified below:

$$\frac{\Delta c2}{\Delta c1} = \frac{\tau^3}{1-\tau^3}$$

This ratio is plotted in FIG. 3A, which shows that if $\tau=r/R=0.873$, then the ratio $$\frac{\Delta c2}{\Delta c1} = 2.$$

The choice of $\tau=0.873$ as the transition point offers a reasonably large chord increase outboard of r/R=0.873 where the air velocity is high, but not so close to the tip that the additional lift margin is eroded due to blade tip losses.

FIG. 3A illustrates that keeping the thrust-weighted chord constant, the ratio of chord increase ($\Delta c2$) outboard of the transition point t/R is balanced to a chord reduction $\Delta c1$ inboard of the transition point.

FIG. 3B illustrates that, for $\tau=0.873$, $\Delta c2=2\Delta c1$. In FIG. 3B, baseline chord 302 and modified chord 304 ("$\tau/R=0.873$") are shown. Inboard of $\tau=0.873$, a reduction of chord by a given amount yields an increase of chord outboard of $\tau=0.873$ of twice the amount of chord reduction inboard of $\tau=0.873$. The objective of increasing chord outboard of the transition radius and decreasing chord inboard of the transition radius is to increase the rotor's stall margin at a high advance ratio. In other words, for the same advance ratio, the rotor blade can achieve greater thrust without stall onset. Additionally, the inboard chord reduction reduces the blade down force within the reverse flow circle.

Next, a thrust margin methodology is developed to evaluate the modified rotor blade. This methodology considers only the retreating rotor blade at $\Psi=270°$. The simplified perspective, illustrated, for example, in FIG. 2, considers the rotor disk to be "flat to the flow," ignoring any coning of the rotor and rotor tip path plane propulsive tilt. An underlying assumption is that if thrust margin can be improved at $\Psi=270°$, the thrust margin should be expected to improve at least that much elsewhere on the azimuth. That is, the advancing blade lift must be compromised by reducing its blade pitch so that the advancing blade's lift moment balances the retreating blade, which, at some higher speed, is near stall. If the retreating blade gains stall margin, then the entire rotor gains margin.

Here, the two blade designs of equal lift (baseline and modified) are compared at $\Psi=270°$. The lift of the baseline rotor blade in forward flight is equated to the lift of the modified rotor blade with the objective of showing a reduction in lift coefficient for the modified rotor blade. That is, if the modified rotor blade can generate the same lift at reduced lift coefficient, the modified rotor blade has gained stall margin (i.e., rotor thrust margin). Since lift can only come from portions of the rotor blade outside the reverse flow circle, the lift integration may be modified to extend only from outboard of the reverse flow circle (i.e., r/R=μ) out to the tip R=1. In other words, $$L_{baseline,\ \Psi=270} = L_{modified,\ \Psi=270} \qquad (10)$$

Recall that the retreating blade at $\Psi=270°$ sees flight speed subtracted from rotational speed, thus $$\int_{\mu R}^{R} \frac{1}{2} \rho (\Omega r - V_\infty)^2 \cdot C_{L1} \cdot c_{baseline}(r) \cdot dr = \qquad (11)$$

$$\int_{\mu R}^{R} \frac{1}{2} \rho (\Omega r - V_\infty)^2 \cdot C_{L2} \cdot c_{modified}(r) \cdot dr$$

If it is assumed that the baseline and modified rotor blades operate at different but constant lift coefficients along their spans, constants may be extracted from the integral and like terms canceled:

$$C_{L1} \int_{\mu R}^{R} \rho(\Omega r - V_\infty)^2 \cdot c_{baseline}(r) \cdot dr = C_{L2} \int_{\mu R}^{R} (\Omega r - V_\infty)^2 \cdot c_{modified}(r) \cdot dr \qquad (12)$$

Since $V_\infty = \mu \Omega R$, substitute and simplify:

$$C_{L1} \int_{\mu R}^{R} \left(\frac{r}{R} - \mu\right)^2 \cdot c_{baseline}(r) \cdot dr = C_{L2} \int_{\mu R}^{R} \left(\frac{r}{R} - \mu\right)^2 \cdot c_{modified}(r) \cdot dr \qquad (13)$$

Yielding:

$$\frac{C_{L2}}{C_{L1}} = \frac{\int_{\mu R}^{R} \left(\frac{r}{R} - \mu\right)^2 \cdot c_{baseline}(r) \cdot dr}{\int_{\mu R}^{R} \left(\frac{r}{R} - \mu\right)^2 \cdot c_{modified}(r) \cdot dr} \qquad (14)$$

Equation (14) is a generic case that allows the ratio $C_{L2}/C_{L1}$ to be solved for any set of chord distributions developed in the preceding methodology where a transition point $\tau=r/R$ is selected, resulting in $$\frac{\Delta c2}{\Delta c1} = \left[\frac{\tau^3}{1-\tau^3}\right].$$

In Equation 14, stall margin may now be calculated for the modified planform. If $C_{L2}$ is less than $C_{L1}$, rotor-blade stall margin has been achieved.

For the notional chord distribution in FIG. 3B, where a 2:1 chord increase was developed for $\tau=0.873$, Equation (14) yields a lift coefficient ratio of $C_{L2}/C_{L1}=0.9023$, indicating a 10% increase in stall margin at a targeted advance ratio of $\mu=0.5$.

Rather than assess thrust margin, in certain cases, it is advantageous to assess speed margin due to a blade planform change. This time the outboard blade lift at $\Psi=270$ is evaluated for two cases: 1) the baseline blade at some baseline advance ratio, $\mu$, and 2) the modified blade at some higher higher (to be determined) $\mu$ at the same lift as the baseline blade. Here, the notion is that the baseline rotor is cannot go any faster due to retreating blade stall. On the other hand, the increased outboard chord blade can delay retreating blade stall effects to a higher advance ratio that will be determined.

Without regard to the actual blade lift coefficient, we merely set up a problem that calculates the lift terms for the baseline blade, integrating from the reverse flow circle boundary to the blade tip. If retreating blade stall is the limiting factor in the baseline speed, then the implication is that the retreating blade lift coefficient is at $C_L$ max. In that case, having a blade with more outboard chord will allow a higher advance ratio to be attained for the same $C_L$ max condition. Thus, we equate the baseline blade lift at $\Psi=270°$ at $\mu1_{stall}$ to the modified blade lift at some higher $\mu2_{stall}$:

$$L_{baseline, \mu1} = L_{modified, \mu2}$$

The key difference in setting up the integrals is in examining the lower limit of integration.

$$\int_{\mu_1 R}^{R} \frac{1}{2}\rho(\Omega r - V_\infty)^2 \cdot C_{Lmax} \cdot c_{baseline}(r) \cdot dr =$$

$$\int_{\mu_2 R}^{R} \frac{1}{2}\rho(\Omega r - V_{\infty 2})^2 \cdot C_{Lmax} \cdot c_{modified}(r) \cdot dr$$

Since we will assume both blades are to operate at the same CL max at their respective limiting advance ratios, we simplify:

$$\tfrac{1}{2}\rho C_L \int_{\mu_1 R}^{R} (\Omega r - V_\infty)^2 \cdot c_{baseline}(r) \cdot dr =$$

$$\tfrac{1}{2}\rho C_L \int_{\mu_2 R}^{R} (\Omega r - V_{\infty 2})^2 \cdot c_{modified}(r) \cdot dr \int_{\mu_1 R}^{R} (\Omega r - V_\infty)^2 \cdot c_{baseline}(r) \cdot dr =$$

$$\int_{\mu_2 R}^{R} (\Omega r - V_{\infty 2})^2 \cdot c_{modified}(r) \cdot dr$$

Since $$\mu = \frac{V_\infty}{\Omega R},$$

we substitute $V_\infty = \mu \Omega R$ $$\int_{\mu_1 R}^{R} (\Omega r - \mu_1 \Omega R)^2 \cdot c_{baseline}(r) \cdot dr = \int_{\mu_2 R}^{R} (\Omega r - \mu_2 \Omega R)^2 \cdot c_{modified}(r) \cdot dr$$

Simplifying, $$\int_{\mu_1 R}^{R} (r/R - \mu_1)^2 \cdot c_{baseline}(r) \cdot dr = \int_{\mu_2 R}^{R} (r/R - \mu_2)^2 \cdot c_{modified}(r) \cdot dr \quad (15)$$

Equation (15) has the same form as equation (13); however, its integration limits extend over different intervals such that the blade lift is the same at different advance ratios. It is important to remember that the respective lower limits of integration $\mu_1 R$, and $\mu_2 R$ represent the fractional point on the blade radius where the net velocity is zero because that point is the maximum extent of the reverse flow circle. The term $(r/R - \mu_2)$ is only positive outside the reverse flow circle. Since the term is squared, the value loses meaning inside the circle.

The practical evaluation of equation (15) is resolved by segmenting the blade to define the respective chords (baseline and modified) at discrete intervals. We calculate the baseline blade lift integral by summing incremental lift outboard of the reverse flow circle which corresponds to the baseline blade. For the modified blade, we set up a "trial" advance ratio, $\mu_2$, higher than the baseline $\mu_1$, and evaluate the sum of the modified blade's lift to see if we match that of the baseline lift. We iteratively adjust (increase) $\mu_2$ until the modified blade lift matches the baseline blade lift. With lift matched, the ratio $\mu_2/\mu_1$ will be indicative of the flight speed increase due to the planform modification.

Figure 4:
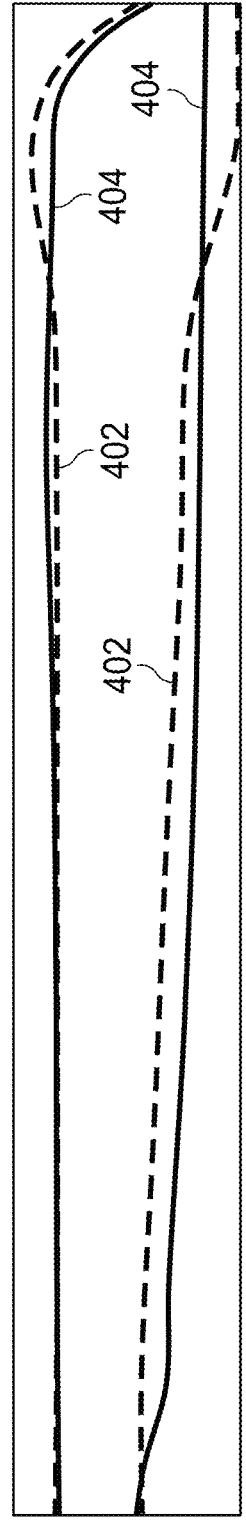
FIG. 4 is a schematic top view of a baseline rotor blade as in FIG. 3B for Tau=0.873, interpreted for stylization and manufacturing.

FIG. 4 is a schematic top view of an illustrative rotor blade 400 in which chord is reduced inboard of the transition radius and increased outboard of the transition radius. FIG. 4 interprets the blade chord in terms of leading and trailing edges, rather than just chord. A leading edge of the illustrated rotor blades is at the top of the FIGURE and a trailing edge is at the bottom thereof. In contrast to FIG. 3B, which illustrates an abrupt change in chord about the transition radius, FIG. 4 smooths the transition as a modified chord 402 relative to a baseline chord 404. The smoothed transition facilitates blade manufacturability, and since the chord distributing is changed, the thrust-weighted chord is continuously monitored to retain the baseline value. In a typical embodiment, a transition region exists, in which a gradual transition from a decreased chord to an increased chord surrounds the transition radius. For example, if a reduction in chord of 1" inboard and an increase of chord of 2" are made relative to a baseline rotor blade, a transition region of 2-6" surrounding the transition radius might be utilized.

A rotor blade with a modified chord distribution as set forth herein addresses manufacturability concerns. First, airfoils are, in a typical embodiment, scaled about the pitch change axis ("PCA") of the rotor blade to ensure the straight ovular spar design is centered in the airfoil and maintains a smooth outer surface. In such cases, the airfoils may be rigged vertically and horizontally to achieve a smooth spar inner surface that creates a draft angle favorable for tool extraction. In various embodiments, reduced blade twist simplifies tooling, manufacturing, and inspection while also reducing overall cost. In a typical embodiment, a two-piece leading edge erosion protection design is used. Inboard, a simple straight erosion strip is utilized. Outboard, a complex contoured erosion strip is used with slight overlap/underlap or butting together.

In at least some embodiments, a high erosion zone at a curved outboard leading-edge region is a complex contour that can be made, for example, via electroforming nickel, a 3D spray coating on a formed substrate (e.g., Tungsten carbide flame spray), additive manufacturing, or cold spray metallic technology. In various embodiments, a trailing-edge transition area at the outboard end of blade may be optimized for manufacturability by smoothing bends for trailing edge unidirectional composite material and aft chord extension shape may be designed to keep the trailing edge shape "manufacturing friendly" for in-plane fiber steering of composite materials without buckling. Moreover, in a typical embodiment, additional area ahead of the PCA may provide space for additional tip weight for one or both of blade tuning and improved characteristics in engine-failure scenarios.

In some embodiments, a rotor-blade trailing-edge transition area at the outboard end of rotor blade may be optimized for manufacturability by controlling the curvature magnitude and rate of change so that the composite material used to reinforce the aft edge of the rotor blade, often referred to as the trailing edge or trailing-edge spar, does not buckle when steered to follow the aft edge planform shape. In a typical embodiment, a simplified spar shape and increased chord length near the tip of the rotor blade provides a larger cavity and subsequently more options for internal weights to be used.

Figure 5:
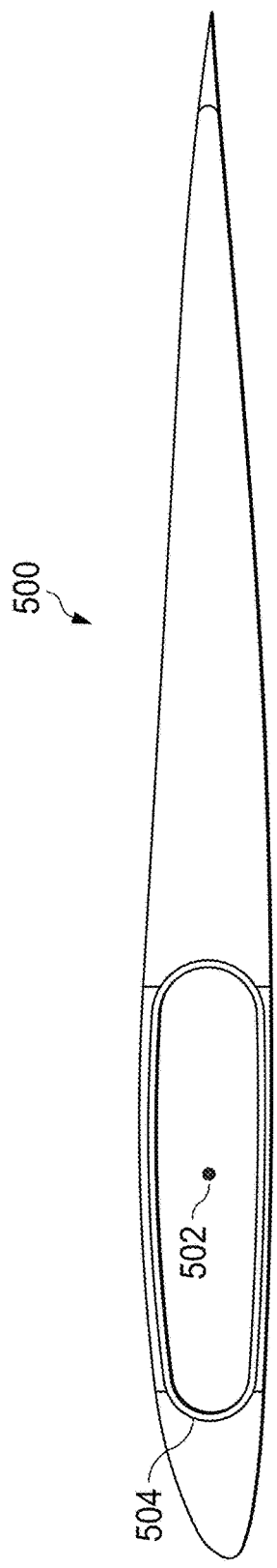
FIG. 5 is a cross-sectional view of an airfoil scaled about a pitch change axis.

FIG. 5 is a side view of an airfoil 500 scaled about the PCA 502 in a manner that ensures a straight ovular blade spar 504 that is centered in the airfoil 500 to maintain a smooth outer surface. The airfoil 500 may be rigged vertically and horizontally to achieve a smooth inner surface of the straight ovular blade spar 504, thereby creating a draft angle favorable for tool extraction.

Figure 6:
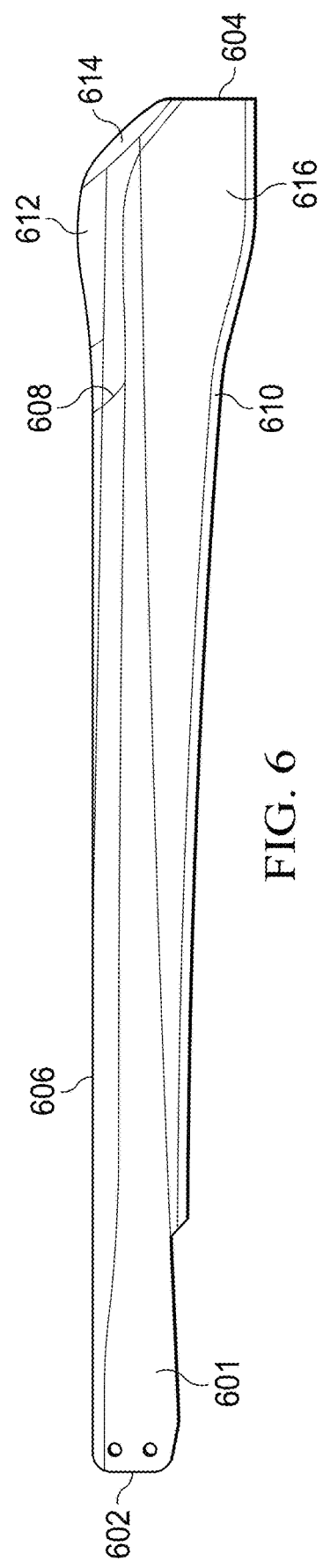
FIG. 6 is a top view of a rotor blade, accounting for operational features such as a leading-edge erosion strip and manufacturing features.

FIG. 6 is a top view of a rotor blade 600 that illustrates various manufacturing features thereof. In a typical embodiment, the rotor blade 600 exhibits relatively low twist over a length of the rotor blade 600, which serves to simplify tooling, manufacturing, and inspection, while also reducing overall cost. The rotor blade includes a spar 601, a root 602 at an inboard end, and a tip 604 at an outboard end. A leading edge of the rotor blade 600 has a stretch-formed corrosion-resistant stainless steel ("CRES") abrasion strip 606 formed on an inboard portion thereof and a complex contoured erosion strip 608 on an outboard portion thereof. In this embodiment, a two-piece leading edge erosion protection design includes a simple straight inboard erosion strip (i.e., the strip 606) in conjunction with a complex contoured erosion strip (i.e., the strip 608) outboard that slightly overlaps/underlaps the inboard erosion strip 606 or butts up thereagainst. A high erosion zone that includes the strip 608 at a curved outboard leading-edge region adjacent the strip 608 is a complex contour that can be made, for example, via electroforming nickel, a 3D spray coating on a formed substrate (e.g., Tungsten-carbide flame spray), additive manufacturing, or cold spray metallic technology.

The rotor blade 600 also includes a uni-directional composite trailing edge 610 at a transition area adjacent the outboard end of the rotor blade 600. The uni-directional composite trailing edge 610 is optimized for manufacturability by controlling the curvature magnitude and rate of change so that the composite material used to reinforce the trailing edge of the rotor blade 600 does not buckle when steered to follow a trailing edge planform shape of the rotor blade 600. An inertial weight 612 is shown adjacent the leading-edge outboard section of the rotor blade 600. A simplified spar shape and increased chord length near the tip 604 provides a larger cavity and consequently more options for inertia weight to be inserted into the rotor blade 600. Also shown are a composite tip block adjacent an outboard leading edge of the rotor blade 600 and skins and afterbody 616.

Although relative terms such as "outer," "outboard," "inner," "inboard," "upper," "lower," and similar terms have been used herein to describe a spatial relationship of one element to another, it is understood that these terms are intended to encompass different orientations of the various elements and components in addition to the orientation depicted in the figures. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. The terms "substantially," "approximately," "generally," and "about" are defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of manufacturing a rotor blade for a rotary aircraft, the method comprising:
   establishing a target thrust-weighted solidity of the rotor blade;
   calculating a reverse flow circle of the rotor blade at a target forward speed of the rotary aircraft; and
   wherein, inboard of the reverse flow circle of the rotor blade, the chord of the rotor blade is less than a chord of a rectangular baseline rotor blade possessing the target thrust-weighted solidity;
   wherein, outboard of the reverse flow circle, the chord of the rotor blade is greater than the chord of the rectangular baseline rotor blade;
   wherein the rotor blade possesses the target thrust-weighted solidity of the baseline rotor blade and improved stall margin or speed margin at the target forward speed relative to the baseline rotor blade; and
   manufacturing the rotor blade with the chord inboard of the reverse flow circle and the chord outboard of the reverse flow circle.

2. The method of claim 1, comprising:
   establishing a transition radius ("τ") about which a transition from a decreased chord to an increased chord occurs;

wherein the transition radius is outside the reverse flow circle.

3. The method of claim 2, wherein:
the transition radius is defined as r/R=τ;
r is an arbitrary radial position on the rotor blade from a rotor-blade root; and
R is the span of the rotor blade.

4. The method of claim 3, wherein:
Δc1 is a linear measurement of decreased chord inboard of the transition radius;
Δc2 is a linear measurement of increased chord outboard of the transition radius; and $$\Delta c2 = \Delta c1 \left[ \frac{\tau^2}{1-\tau^3} \right].$$

5. The method of claim 1, wherein the steps are performed in the order listed.

6. The method of claim 2, comprising:
modifying the rotor blade by:
increasing the decreased chord from a position inboard of the transition radius to the transition radius; and
decreasing the increased chord from a position outboard of the transition radius to the transition radius; and
verifying that thrust-weighted solidity of the modified rotor blade equals the target thrust-weighted solidity.

7. The method of claim 2, wherein τ is greater than 0.8.

8. A rotor blade for a rotary aircraft, the rotor blade comprising:
first chord inboard of a reverse flow circle of the rotor blade, wherein the reverse flow circle of the rotor blade is calculated at a target forward speed of the rotary aircraft;
second chord outboard of the reverse flow circle;
wherein the rotor blade possesses a target thrust-weighted solidity of a rectangular baseline rotor blade;
wherein the rotor blade possesses improved stall margin at a target forward speed relative to the rectangular baseline rotor blade; and
wherein chord of the rectangular baseline rotor blade inboard of the reverse flow circle is greater than the first chord and chord of the rectangular baseline rotor blade outboard of the reverse flow circle is less than the second chord.

9. The rotor blade of claim 8, comprising:
a transition radius ("τ") about which a transition from the first chord to the second chord occurs;
wherein the transition radius is outside the reverse flow circle.

10. The rotor blade of claim 9, wherein:
the transition radius is defined as r/R=τ;
r is an arbitrary radial position on the rotor blade from a rotor-blade root; and
R is the span of the rotor blade.

11. The rotor blade of claim 10, wherein:
wherein the chord of the rectangular baseline rotor blade inboard of the transition radius is greater than the first chord and the chord of the rectangular baseline rotor blade outboard of the transition radius is less than the second chord;
Δc1 is a linear measurement of a difference between the chord of the rectangular baseline rotor blade inboard of the transition radius and the first chord;
Δc2 is a linear measurement of a difference between the chord of the rectangular baseline rotor blade outboard of the transition radius and the second chord; and $$\Delta c2 = \Delta c1 \left[ \frac{\tau^2}{1-\tau^2} \right].$$

12. The rotor blade of claim 9, comprising:
a first transition region in which chord increases from a position inboard of the transition radius to the transition radius; and
a second transition radius in which chord decreases from a position outboard of the transition radius to the transition radius; and
wherein thrust-weighted solidity of the rotor blade, including the first and second transition regions, equals the target thrust-weighted solidity.

13. The rotor blade of claim 9, wherein τ is greater than 0.8.

14. The rotor blade of claim 8, wherein the rotor blade is scaled about a pitch change axis of the rotor blade.

15. The rotor blade of claim 8, wherein the rotor blade exhibits twist over a length of the rotor blade.

16. The rotor blade of claim 8, wherein a leading edge of the rotor blade comprises a stainless-steel abrasion strip.

17. The rotor blade of claim 8, comprising a uni-directional composite trailing edge adjacent an outboard end thereof.

18. The rotor blade of claim 8, comprising an erosion zone formed via at least one of electroforming nickel, 3D spray coating on a formed substrate, additive manufacturing, and cold spray metallic technology.

19. The rotor blade of claim 10, wherein:
the chord of the rectangular baseline rotor blade with a desired thrust-weighted solidity is modified to retain the baseline thrust-weighted solidity after the planform chord is modified according to the methodology:

$$\Delta c2 = \Delta c1 \left[ \frac{\tau^2}{1-\tau^3} \right];$$

inboard chord reductions Δc1 are traded for outboard chord increases Δc2; and
τ represents a radial station r/R; and
the modified planform transitions from a chord reduction Δc1 to a chord increase, Δc2.

20. The rotor blade of claim 19, wherein:
the methodology $$\Delta c2 = \Delta c1 \left[ \frac{\tau^2}{1-\tau^3} \right]$$

is used to achieve a target value of retreating blade stall margin, $$\frac{C_{L_2}}{C_{L_1}},$$

according to the methodology:
$L_{baseline, \Psi=270} = L_{modified, \Psi=270}$ which results in the relationship:

$$\frac{C_{L2}}{C_{L1}} = \frac{\int_{\mu R}^{R} \left(\frac{r}{R} - \mu\right)^2 \cdot c_{baseline}(r) \cdot dr}{\int_{\mu R}^{R} \left(\frac{r}{R} - \mu\right)^2 \cdot c_{modified}(r) \cdot dr}$$

stall margin, represented by $$\frac{C_{L2}}{C_{L1}},$$

is achieved for the retreating blade at advance ratio $\mu$.

21. The rotor blade of claim 20, wherein:
the methodology $$\Delta c2 = \Delta c1 \left[\frac{\tau^2}{1-\tau^2}\right]$$

is used to achieve a target value of rotor thrust margin at high advance ratio according to the methodology:
$L_{baseline,\ \Psi=270} = L_{modified,\ \Psi=270}$ which results in the relationship:

$$\frac{C_{L2}}{C_{L1}} = \frac{\int_{\mu R}^{R} \left(\frac{r}{R} - \mu\right)^2 \cdot c_{baseline}(r) \cdot dr}{\int_{\mu R}^{R} \left(\frac{r}{R} - \mu\right)^2 \cdot c_{modified}(r) \cdot dr}$$

stall margin $$\frac{C_{L2}}{C_{L1}}$$

of the retreating blade is inferred to provide overall rotor thrust margin of similar magnitude at advance ratio $\mu$.

22. The rotor blade of claim 19, wherein:
the methodology $$\Delta c2 = \Delta c1 \left[\frac{\tau^2}{1-\tau^2}\right]$$

is used to achieve a target value of rotor flight speed margin according to the methodology defined for the blade at $\psi=270°$, where:
$L_{baseline,\ \mu 1} = L_{modified,\ \mu 2}$, results in the relationship:

$$\int_{\mu_1 R}^{R} \left(\frac{r}{R} - \mu_1\right)^2 \cdot c_{baseline}(r) \cdot dr = \int_{\mu_2 R}^{R} \left(\frac{r}{R} - \mu_2\right)^2 \cdot c_{modified}(r) \cdot dr$$

flight speed margin is inferred from the difference in advance ratio $(\mu_2 - \mu_1)$.

\* \* \* \* \*